(12) United States Patent
Emlind et al.

(10) Patent No.: US 12,535,104 B2
(45) Date of Patent: Jan. 27, 2026

(54) CYLINDRICAL ROLLER BEARING

(71) Applicant: AKTIEBOLAGET SKF, Gothenburg (SE)

(72) Inventors: Roger Daniel Emlind, Alingsas (SE); Arne Lars Jonas Kullin, Landvetter (SE); Harald Metz, Randersacker (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 60 days.

(21) Appl. No.: 18/028,905

(22) PCT Filed: Oct. 14, 2020

(86) PCT No.: PCT/EP2020/078834
§ 371 (c)(1),
(2) Date: Mar. 28, 2023

(87) PCT Pub. No.: WO2022/078583
PCT Pub. Date: Apr. 21, 2022

(65) Prior Publication Data
US 2023/0340991 A1    Oct. 26, 2023

(51) Int. Cl.
*F16C 23/08*     (2006.01)
*F16C 19/26*     (2006.01)
*F16C 33/58*     (2006.01)

(52) U.S. Cl.
CPC ............ *F16C 23/088* (2013.01); *F16C 19/26* (2013.01); *F16C 33/585* (2013.01); *F16C 2240/50* (2013.01)

(58) Field of Classification Search
CPC .... F16C 33/585; F16C 33/605; F16C 23/088; F16C 2240/50
See application file for complete search history.

(56) References Cited

U.S. PATENT DOCUMENTS

| | | | |
|---|---|---|---|
| 2,294,289 A | 8/1942 | Frauenthal | |
| 8,398,312 B2 * | 3/2013 | Fujiwara | F16C 23/088 384/568 |
| 9,341,249 B2 * | 5/2016 | Bouron | F16H 35/06 |

FOREIGN PATENT DOCUMENTS

| | | |
|---|---|---|
| DE | 10004584 C1 | 5/2001 |
| DE | 102008060479 A1 | 6/2010 |
| DE | 102011077214 B4 | 1/2018 |

(Continued)

OTHER PUBLICATIONS

Translation of DE102011077214 obtained Nov. 5, 2024.*

(Continued)

*Primary Examiner* — James Pilkington
(74) *Attorney, Agent, or Firm* — J-TEK LAW PLLC; Scott T. Wakeman; Mark A. Ussai

(57) ABSTRACT

A cylindrical roller bearing includes at least one outer ring with a raceway, an inner ring with a raceway, and a plurality of cylindrical roller elements rollable along the raceways of the inner ring and the outer ring. The raceway of the inner ring has an at least partly crowned profile, the crowned profile having a crowning radius R and is formed such that: $25 L^2/D < R < 55 L^2/D$, in which L is the length of each one of the cylindrical roller elements and D is the diameter of each one of the cylindrical roller elements.

10 Claims, 3 Drawing Sheets

(56) References Cited

FOREIGN PATENT DOCUMENTS

| | | | |
|---|---|---|---|
| DE | 102018213951 A1 | 2/2020 | |
| EP | 1605175 A2 | 12/2005 | |
| JP | H0460215 A | 2/1992 | |
| JP | 2921046 B2 * | 4/1999 | |
| JP | 2007132409 A * | 5/2007 | ............. F16C 19/26 |
| JP | 2008185051 A * | 8/2008 | ............. F16C 19/30 |
| JP | 2008248993 A | 10/2008 | |

OTHER PUBLICATIONS

Translation of JP-2921046 obtained Nov. 5, 2024.*
Translation of JP2007132409 obtained May 20, 2025.*
International Search Report and Written Opinion dispatched Jun. 23, 2021 in related application No. PCT/EP2020/078834.

* cited by examiner

CYLINDRICAL ROLLER BEARING

CROSS-REFERENCE

This application is the U.S. National Stage of International Application No. PCT/EP2020/078834 filed on Oct. 14, 2020.

BACKGROUND OF THE INVENTION

The present invention relates to bearings, and more particularly to cylindrical roller bearings.

In heavy duty application, such as continuous casters, not only heavy load but also often high thermal variation in the roll can induce internal thrust loads on the bearings, eventually resulting in bearing failure. Particularly, non-locating bearings supporting a shaft are affected.

With conventional non-locating bearing, the fits for this bearing are selected to provide axial movement of one of the bearing rings, generally the outer ring, on its seat. This axial movement is accompanied by friction that induces axial loads in both bearings. In addition, the movement of the bearing with a loose fit on its seat can create damaging vibrations because the movement is "stick-slip" and not smooth. This loose fit has a negative effect on the stiffness of the bearing arrangement. The bearing ring with the loose fit can also begin to creep, which wears the seat and leads to fretting corrosion which, if left unchecked, could cause fretting of the ring to its seat.

For solving this problem, so-called toroidal roller bearings are proposed. A toroidal roller bearing is a single row roller bearing with relatively long, slightly crowned rollers, wherein inner and outer ring raceways are correspondingly concave and symmetrical. The toroidal roller bearing may be designed as a non-locating bearing that combines the self-aligning ability of a spherical roller bearing with the ability to accommodate axial displacement like a cylindrical or needle roller bearing. Further, both rings of the non-locating bearing can be axially located in the housing and on the shaft. This means it possible to secure the rings so that they cannot creep. By mounting them with an interference fit, it is also possible to enhance the radial stiffness of the bearing arrangement. Due to the possibility to axially secure the rings in the bearing, internal preload and wear to the bearing seat in the housing are avoided. Further, toroidal roller bearings are designed to accommodate axial displacement without inducing additional axial internal forces or friction. This means that the loads acting on the bearing are determined exclusively by external radial and axial forces. Because of this, a bearing system incorporating a toroidal roller bearing, e.g. as non-locating bearing, has lower resultant loads and a better load distribution than a conventional bearing system. This also translates into lower operating temperatures, higher operating viscosities, extended relubrication intervals, and a significantly longer service life for both the bearings and the lubricant.

Disadvantageously, due to the axial fixation of the rings, disassembling of the toroidal roller bearings during service is not possible which has become a major problem, recently. Since the toroidal roller bearings are stuck to the shaft, they have to be destroyed during disassembly. Reuse is not possible.

SUMMARY OF THE INVENTION

It is therefore object of the present invention, to provide a bearing assembly having similar properties for heavy duty applications as conventional toroidal roller bearings, but may be easily dismounted and replaced during service.

This object is solved by a cylindrical roller bearing including at least one outer ring with a raceway, an inner ring with a raceway and a plurality of cylindrical roller elements rollable along the raceways of the inner ring and the outer ring. The raceway of the inner ring has an at least partly crowned profile, the crowned profile having a crowning radius R and is formed such that: $25\ L^2/D < R < 55\ L^2/D$, wherein L is the length of each one of the cylindrical roller elements and D is the diameter of each one of the cylindrical roller elements.

In the following, a cylindrical roller bearing is proposed which has at least an outer ring with a raceway, an inner ring with a raceway and a plurality of cylindrical roller elements rolling at the raceways of the inner ring and the outer ring. For combining the possibility to dismount the bearing with the same functional advantages of the toroidal roller bearing as mentioned above, e.g. angular misalignment and axial displacement, the inner ring raceway of the cylindrical roller bearing is not flat as in conventional cylindrical roller bearings, but has at least partly a crowned profile. In contrast to the traditional opinion that the crowning of the inner ring of a cylindrical roller bearing is disadvantageous as the contact stresses would become too high, the inventors have surprisingly found that the crowned profile of the inner rings allows for controlling the contact stresses, and for a facilitated disassembling process without reducing the bearing properties in general.

According to a preferred embodiment, the crowned profile has a crowning radius R, wherein $25\ L^2/D < R < 55\ L^2/D$, and wherein L is the length of the roller element and D is the diameter of the roller element. This allows for a high permissible angular misalignment $\beta$, e.g. in the range of $+/-1°$, or at least $+/-0.5°$.

According to a further preferred embodiment, the cylindrical roller elements are in line contact with the raceways of the inner ring and the outer ring, wherein the axial extension of the line contact of the cylindrical roller element at the raceway of the inner ring is shorter than the axial extension of the line contact of the cylindrical roller element at the raceway of the outer ring. The shorter line contact between the inner ring and the roller element in combination with the crowned profile allows for increased misalignment properties as well as simplified mounting and dismounting properties.

According to a further embodiment, the entire raceway of the inner ring has a crowned profile. This increases the angular misalignment properties further and allows misalignments in the range of degrees instead of only minutes.

Furthermore, the cylindrical roller bearing may be adapted for use as a non-locating bearing. Under load conditions, e.g. bending of a shaft, which may lead to an angular misalignment of the shaft in relation to the supporting bearings, or high temperature applications, the roller elements may be axially displaced. The crowned profile allows then for an angular misalignment of the roller elements as well as an axial displacement in relation to the inner ring, which in turn allows for supporting a shaft even if there is an angular/axial misalignment induced by the heavy load acting on the shaft or thermal extensions due to high temperatures.

According to a further preferred embodiment, a curvature of the crowned profile may be constant over the axial length of the raceway or a curvature of the crowned profile may vary over the axial length of the raceway. Thereby, the cylindrical roller bearing may be adapted and optimized for the expected application. E.g. in applications where only a high angular misalignment but no heavy loads are expected, the crowned profile could be constant, wherein in application where both a high angular misalignment and heavy loads are expected, a varying profile with an almost flat region between two regions with a higher curvature profile may be advantageous.

It is further advantageous, that also the cylindrical roller elements have a profile, preferably a logarithmic profile. This increases the angular misalignment properties of the crowned profile, without reducing the load capacity of the bearing, as the main part of the roller remains in line contact with the rings.

As mentioned above, the crowned profile may have a crowning radius R, wherein $25 \, L^2/D < R < 55 \, L^2/D$, and wherein L is the length of the roller element and D is the diameter of the roller element. This allows for a high permissible angular misalignment $\beta$, e.g. in the range of +/−1°, or at least +/−0.5°, a high load carrying capacity as the roller filling degree FG may be larger than 80%, preferably larger than 87%, and a high axial displacement of up to 25%, preferably up to 15%, of the bearing width.

According to a further preferred embodiment, the roller elements are maintained in a cage, preferably a window-type cage, which is adapted to incorporate an increased amount of rollers. A window-type cage usually comprises two side rings which are connected by cage bars. Between the cage bars so called pockets are formed in which the roller elements are accommodated. In high capacity cages, the cage bars, which usually are orientated around the roller pitch circle (the connecting circle of the mid-points of all rollers), are moved away from the roller pitch circle, so that the rollers can be placed closer to each other and more rollers may be incorporated into the bearing.

According to a further embodiment the cage is a high capacity cage, which is roller guided and/or arranged well below a pitch diameter of the roller elements. Thereby, a high capacity cage may be provided which increases the number of roller elements which can be maintained in the cage (filling degree). The increased number of roller elements increases the load carrying capability of the cylindrical roller bearing even further. By means of the high capacity cage, a roller filling degree FG of more than 80%, preferably more than 87%, is possible. The roller filling degree is calculated by $FG=D/(P*\sin(\pi/Z))$, with D being the diameter of the roller element, P the pitch diameter and Z, the number of roller elements.

It is further preferred that the cylindrical roller bearing is a nearly full complement cylindrical roller bearing, wherein optionally the roller elements are accommodated in a cage. As mentioned above, the crowned profile allows for an increased load carrying capacity with a high roller filling degree. The high number of rollers increase the load carrying capacity, wherein the optional cage allows for an even further increased speed capability and separable mounting and dismounting of the bearing.

According to a further preferred embodiment, the outer ring of the cylindrical bearing assembly is provided with flange arranged at least at a first axial end of the outer ring for axially retaining the cylindrical roller elements at the first side. Preferably, at the second axial end, the outer ring has a groove which is adapted to accommodate a retaining ring for axially retaining the cylindrical roller elements at the second side.

It is further preferred that the inner ring has at least a first area with a crowned profile and a second area with a flat profile, wherein preferably the area with the crowned profile is arranged at axial ends of the inner ring and the area with the flat profile is arranged between the areas with the crowned profile. This allows for increased load carrying properties as, in the flat region, the bearing acts as cylindrical roller bearing. Cylindrical roller bearings are preferably applicable for supporting heavy radial loads and provide high speeds. At the same time axial displacement, high stiffness, low friction and long service life is provided.

Furthermore, the cylindrical roller bearing may be adapted for use as a non-locating bearing. Advantageously, under unloaded running conditions, the cylindrical roller bearing may be designed to be mainly in line contact with the area of the raceway having the flat profile. Under load conditions, e.g. bending of a shaft, which may lead to an angular misalignment of the shaft in relation to the supporting bearings, the roller elements may be axially displaced and may come in contact with the crowned profile adjacent to the flat profile. The crowned profile in turn allows then for an angular misalignment of the roller elements in relation to the inner ring, which in turn allows for supporting the shaft even if there is an angular misalignment induced by the heavy load acting on the shaft.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE SEVERAL VIEWS OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figure show.

DETAILED DESCRIPTION OF THE INVENTION

Figure 1:
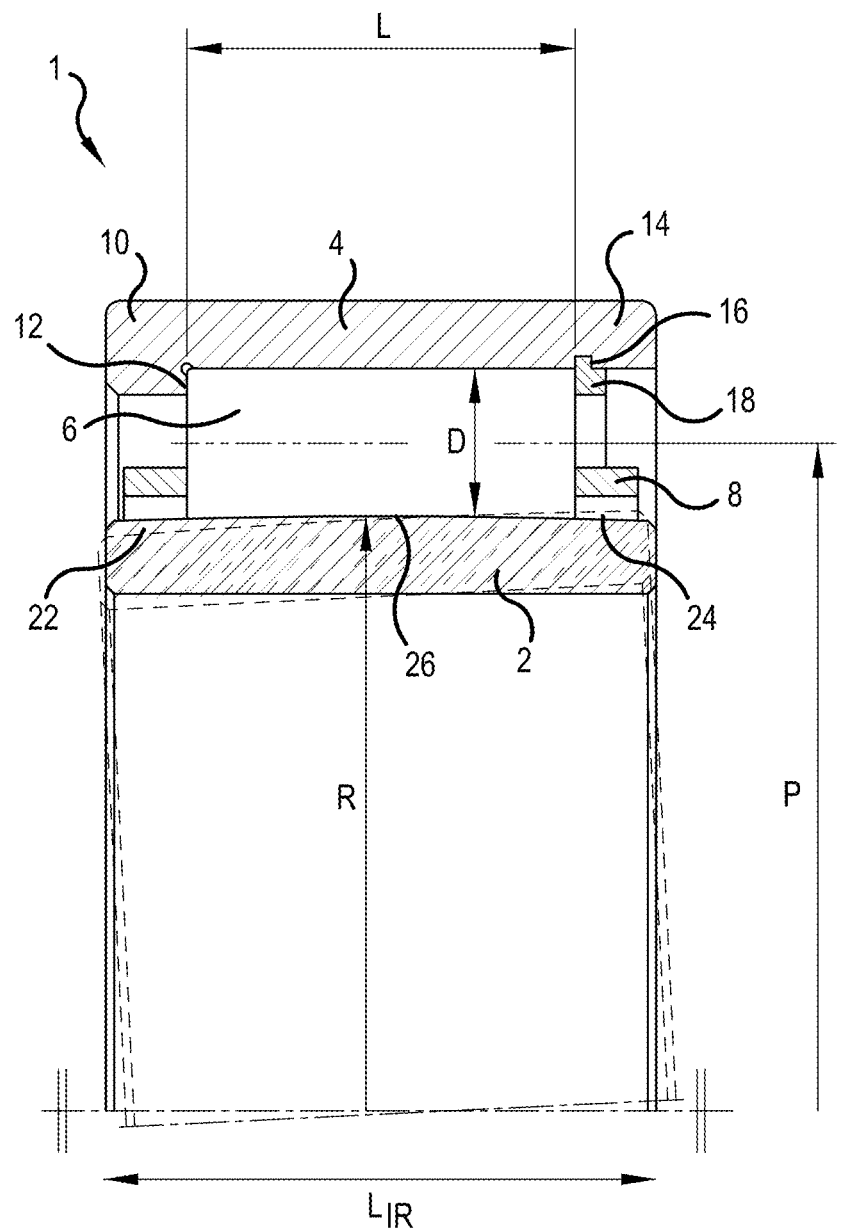
FIG. 1: a schematic cross section of a cylindrical roller bearing according to a preferred embodiment

In the following same or similar functioning elements are indicated with the same reference numerals.

FIG. 1 illustrates a schematic cross section of a cylindrical roller bearing 1 having an inner ring 2 and an outer ring 4 between which a plurality of roller elements 6 are arranged.

The roller elements 6 in the illustrated embodiment are cylindrical roller elements which accommodated in a cage 8. The cage 8 is adapted to hold the roller elements 6 and maintain a constant distance between them. As can be further seen in FIG. 1, the cage 8 is a so-called high capacity cage, which is guided by the roller elements. The cage bars (not illustrated) are arranged well below the pitch diameter P of the rollers 6. Thus, the illustrated cylindrical roller bearing 1 is a nearly full compartment bearing. The new design allows for a roller filling degree FG of more than 80%, preferably more than 87%, with $FG=D/(P*\sin(\pi/Z))$, with D being the diameter of the roller element, P the pitch diameter and Z, the number of roller elements. Other arrangements are also possible.

The outer ring 4 has at a first axial side 10 a flange 12, and at the second axial side 14 a groove 16 in which a retaining ring 18 is accommodated. The flange 12 and the retaining ring 18 allow for an axial restriction of the cylindrical roller elements 6. During disassembling, the retainer ring may be easily detached from the outer ring 4, which in turn allows for a facilitated and non-destroying disassembling of the complete bearing 1 during service.

Figure 3:
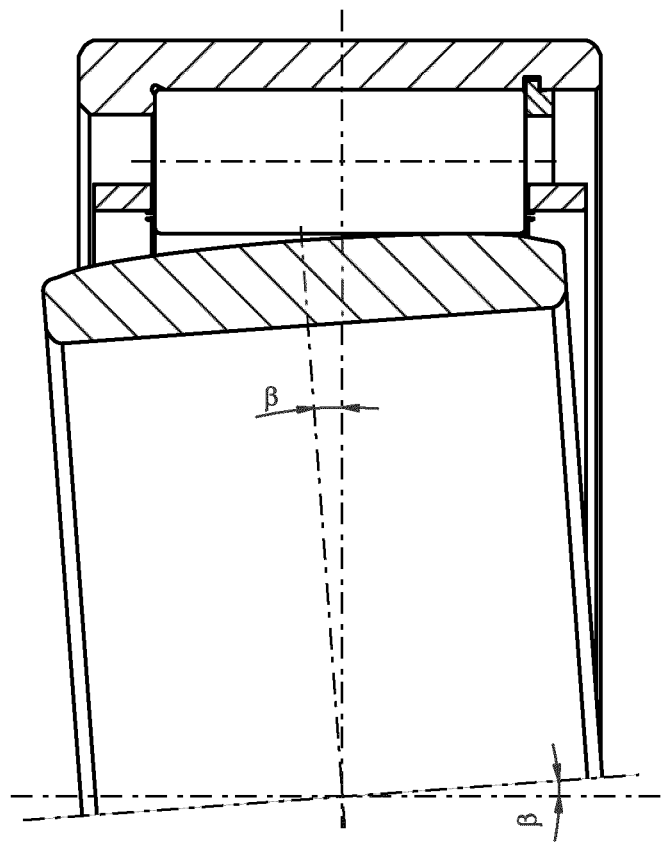
FIG. 3: a schematic cross section of a cylindrical roller bearing illustrating an angular misalignment.

As can be further seen in FIG. 1, the inner ring 2 has a crowned profile having a crowning radius R. The crowning radius R may be constant or can vary over the axial length $L_{IR}$ of the inner ring 2. In the illustrated embodiment, the crowning radius is constant and may be in the range of $25 L^2/D < R < 55 L^2/D$, wherein L is the length of the roller element and D is the diameter of the roller element. This crowning radius R allows for an angular misalignment β of up to +/−1°, or at least +/−0.5° (see FIG. 3).

Figure 2:
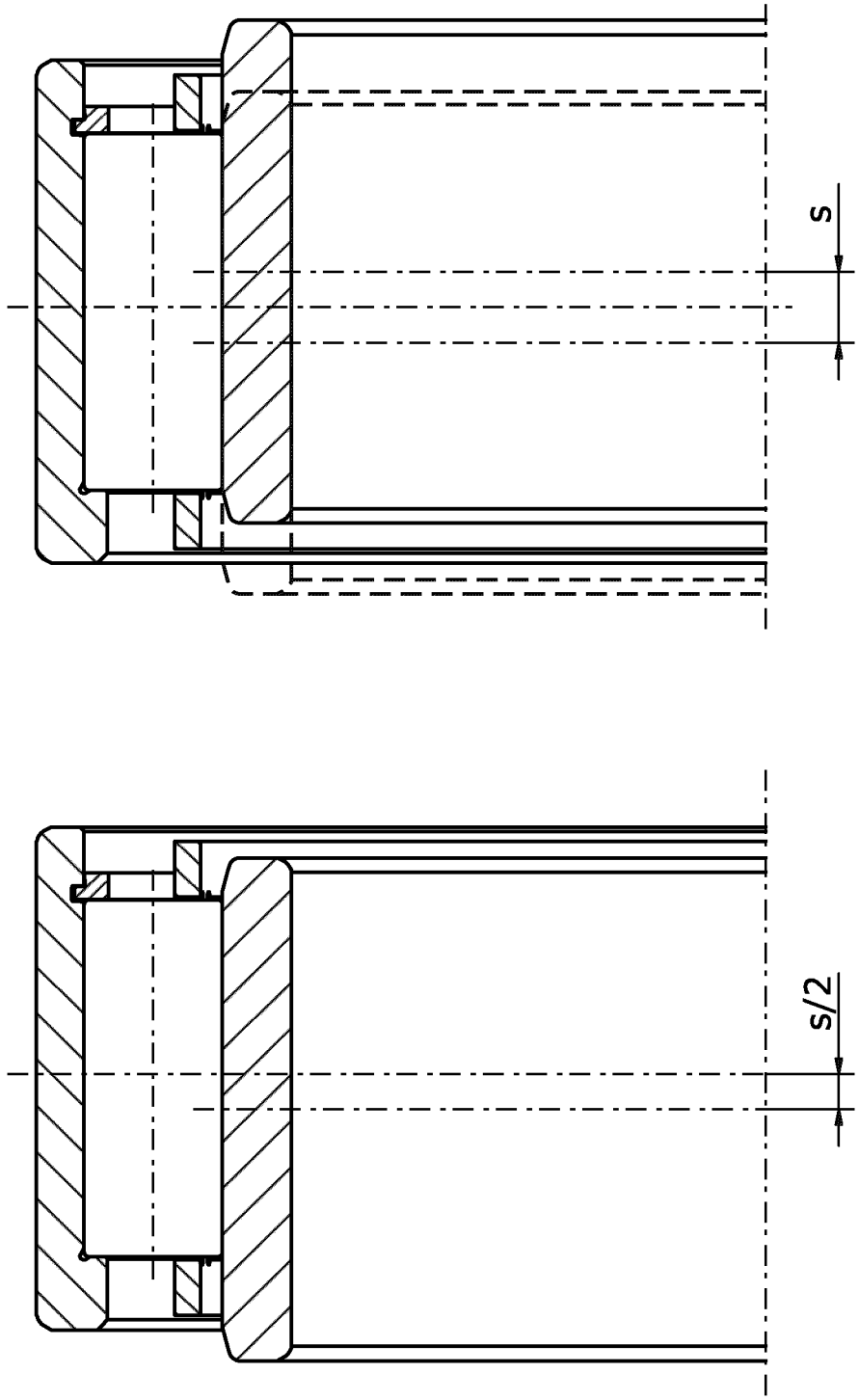
FIG. 2: a schematic cross section of a cylindrical roller bearing illustrating an axial displacement.

The crowning profile of the inner ring 2 also allows for axial displacements of up to 25%, at least up to 15%, of the bearing width given by the axial length $L_{IR}$ of the inner ring 2 (see FIG. 2). This is due to the fact that even if the inner ring has a crowning profile, the profile remains flat enough for providing a sufficiently long line contact with the roller elements and therefore a sufficient support during the axial displacement.

Additionally or alternatively, the inner ring 2 may have a crowning profile which is only arranged at the axial sides 22 and 24 of the inner ring 2, wherein the middle part 26 of the inner ring 2 may remain, preferably almost, flat. This allows for a large load capacity, as a line contact between the roller element and the inner ring may be adapted to be maximal.

In summary, the above proposed cylindrical roller bearing combines the possibility to separate the inner ring from the outer ring and roller elements with the possibility to angular misalignment together with axial displacement. This is achieved by providing an inner ring with a crowned profile which has traditionally been assumed to increase contact stresses, unduly. However, the careful adaption of the crowning radius ensures that contact stresses may be avoided, and angular misalignments in the order of degrees instead of minutes are allowed.

REFERENCE NUMERALS 1 cylindrical roller bearing
2 inner ring
4 outer ring
6 cylindrical roller element
8 cage
10 first axial side of outer ring
12 flange
14 second axial side of outer ring
16 groove
18 retaining ring
22 first axial side of inner ring
24 second axial side of inner ring
26 middle part of the inner ring
P pitch diameter
β misalignment angle
S axial displacement
$L_{IR}$ length of the inner ring
L length of the roller element
D diameter of the roller element

The invention claimed is:

1. A cylindrical roller bearing comprising:
   at least one outer ring with a raceway,
   an inner ring with a raceway,
   a plurality of cylindrical roller elements rollable along the raceways of the inner ring and the outer ring, and
   a roller guided cage arranged radially inwardly of a pitch diameter of the cylindrical roller elements and spaced radially outwardly from the inner ring, the cage including two side rings and a plurality of cage bars connecting the side rings so as to form pockets, the cylindrical roller elements being accommodated within the pockets,
   wherein the raceway of the inner ring has an at least partly crowned profile, the crowned profile having a crowning radius R and is formed such that:

$25L^2/D < R < 55L^2/D,$ wherein L is the length of each one of the cylindrical roller elements and D is the diameter of each one of the cylindrical roller elements; and
   wherein the inner ring raceway formed with the crowned profile having the crowning radius R and the roller guided cage being spaced radially outwardly from the inner ring enables an angular misalignment (β) in the full range of +/−1° and an axial displacement in the full range of 0% to 25% of an axial length of the inner ring.

2. The cylindrical roller bearing according to claim 1, wherein each one of the cylindrical roller elements is in line contact with the raceway of the inner ring and with the raceway of the outer ring, the axial extent of the line contact of each one of the cylindrical roller elements at the raceway of the inner ring is shorter than the axial extent of the line contact of each one of the cylindrical roller elements at the raceway of the outer ring.

3. The cylindrical roller bearing according to claim 1, wherein the entire raceway of the inner ring has a crowned profile.

4. The cylindrical roller bearing according to claim 1, wherein the crowning radius of the crowned profile is constant over the axial length of the raceway or the crowning radius of the crowned profile varies over the axial length of the raceway.

5. The cylindrical roller bearing according to claim 1, wherein the cylindrical roller bearing has a filling degree FG of greater than 80%, the filling degree being defined by:

$FG = D/(P*\sin(\pi/Z)),$ wherein D is the diameter of each one of the cylindrical roller elements, P is the pitch diameter of the cylindrical roller elements, and Z is the number of the cylindrical roller elements.

6. The cylindrical roller bearing according to claim 5, wherein the filling degree is greater than 87%.

7. The cylindrical roller bearing according to claim 1, wherein the outer ring has first and second axial ends, a flange located at the first axial end, the flange axially retaining the cylindrical roller elements at the first axial end, and a groove at the second axial end, the groove being adapted to accommodate a retaining ring for axially retaining the cylindrical roller elements at the second axial end.

8. The cylindrical roller bearing according to claim 1, wherein the inner ring can accommodate an axial displacement of up to 25% of the bearing width.

9. The cylindrical roller bearing according to claim 1, wherein the entire raceway of the inner ring has a crowned profile and the crowning radius of the crowned profile is constant over the entire axial length of the inner ring.

10. The cylindrical roller bearing according to claim 1, wherein the raceway of the inner ring has two axial sides and a middle part, the crowning profile being arranged at the two axial sides and the middle part is flat.

* * * * *